United States Patent

Brown et al.

(10) Patent No.: US 6,723,158 B2
(45) Date of Patent: Apr. 20, 2004

(54) GAS SEPARATOR IMPROVEMENTS

(75) Inventors: Donn J. Brown, Broken Arrow, OK (US); Brown L. Wilson, Tulsa, OK (US)

(73) Assignee: Baker Hughes Incorporated, Houston, TX (US)

(*) Notice: Subject to any disclaimer, the term of this patent is extended or adjusted under 35 U.S.C. 154(b) by 2 days.

(21) Appl. No.: 10/157,460

(22) Filed: May 29, 2002

(65) Prior Publication Data

US 2002/0178924 A1 Dec. 5, 2002

Related U.S. Application Data

(60) Provisional application No. 60/294,548, filed on May 30, 2001.

(51) Int. Cl.[7] .............................................. B01D 19/00
(52) U.S. Cl. ........................... 96/214; 96/196; 96/216; 96/217; 166/105.5
(58) Field of Search ............... 95/241, 248, 243, 95/252, 260, 261; 96/155, 195, 196, 208, 209, 210, 211, 212, 213, 214, 216, 217; 166/105.5, 105.6

(56) References Cited

U.S. PATENT DOCUMENTS

| | | | | |
|---|---|---|---|---|
| 1,628,900 A | * | 5/1927 | Neilsen | |
| 3,204,696 A | * | 9/1965 | Priester et al. | |
| 3,300,950 A | * | 1/1967 | Carle | |
| 3,624,822 A | * | 11/1971 | Carlle et al. | |
| 3,887,342 A | * | 6/1975 | Bunnelle | |
| 4,088,459 A | * | 5/1978 | Tuzson | |
| RE30,836 E | * | 12/1981 | Bunnelle | |
| 4,344,774 A | * | 8/1982 | Skipper | |
| 4,481,020 A | | 11/1984 | Lee et al. | |
| 4,531,584 A | * | 7/1985 | Ward | |
| 4,900,433 A | * | 2/1990 | Dean et al. | |
| 4,913,630 A | * | 4/1990 | Cotherman et al. | |
| 4,981,175 A | | 1/1991 | Powers | |
| 5,207,810 A | | 5/1993 | Sheth | |
| 5,431,228 A | | 7/1995 | Weingarten et al. | |
| 5,482,117 A | | 1/1996 | Kolpak et al. | |
| 5,516,360 A | * | 5/1996 | Normandeau et al. | |
| 5,525,146 A | | 6/1996 | Straub | |
| 5,570,744 A | * | 11/1996 | Weingarten et al. | |
| 5,698,014 A | * | 12/1997 | Cadle et al. | |
| 5,794,697 A | | 8/1998 | Wolflick et al. | |
| 5,902,378 A | * | 5/1999 | Obrejanu | |
| 5,992,521 A | | 11/1999 | Bergren et al. | |
| 6,036,749 A | * | 3/2000 | Ribeiro et al. | |
| 6,066,193 A | * | 5/2000 | Lee | |
| 6,113,675 A | | 9/2000 | Branstetter | |
| 6,116,338 A | * | 9/2000 | Morrison et al. | |
| 6,155,345 A | * | 12/2000 | Lee et al. | |
| 6,382,317 B1 | * | 5/2002 | Cobb | |
| 6,564,865 B1 | * | 5/2003 | Brady et al. | |
| 2002/0178924 A1 | * | 12/2002 | Brown et al. | |

* cited by examiner

*Primary Examiner*—Duane S. Smith
(74) *Attorney, Agent, or Firm*—Bracewell & Patterson, L.L.P.

(57) ABSTRACT

A gas separator has a separator member that rotates with a shaft for separation of fluid components. A flow divider directs more dense fluid to the pump and less dense fluid into an annulus surrounding the pump. An impeller is located within the flow divider for urging fluid out of a downstream gas exit port. A single large gas exit port is used and may be combined with use of a single large fluid inlet. An auger may be located within the rotary separator member. Holes may be located in the sidewall of the rotary member or chamber. The holes are preferably located in a helical pattern above and adjacent the flights of the auger or are in vertical columns adjacent the baffles. The chamber may have a cylindrical or tapered profile. Alternatively, a series of sub-chambers may be used, each having a smaller radius than the preceding, upstream sub-chambers.

23 Claims, 3 Drawing Sheets

GAS SEPARATOR IMPROVEMENTS

This invention claims the provisional application filing date of May 30, 2001, Ser. No. 60/294,548, entitled "Gas Separator Improvements".

BACKGROUND OF THE INVENTION

1. Field of the Invention

This invention generally relates to improvements to gas separators and particularly relates to improvements in downhole gas separators used in fluid-producing wells.

2. Description of the Prior Art

In fluid wells, naturally-occurring gas bubbles within the fluid may reduce the efficiency of a downhole pump used to pump the fluid to the surface. A gas separator is used to ensure that a high quality, pumpable liquid is fed to the pump. The term "gas separators" is actually a misnomer, in that these are used to divide the fluid into two streams, and both streams may contain liquid. One stream comprises higher quality fluid containing less gas and exits out of the liquid exit port. The second stream, which has a higher gas content, exits out of the separator through gas exit ports.

FIGS. 1 and 2 show a prior art separator 11, which is shown as a component of a downhole, electric, submersible pump (ESP) assembly and located between a pump 15 and a seal section 17. An annulus 19 is defined by the outer surfaces of ESP 13 and the inner surface of the casing in the well. A central shaft extends upward from a motor (not shown) and through seal section 17 for engaging a central shaft 21 in separator 11 and another (not shown) in pump 15 for rotationally driving separator 11 and pump 15. Fluid travels up the well and enters separator 11 through openings 23 at its lower end. The fluid is separated by an internal rotating member with blades attached to shaft 21. The separator may also have an inducer pump or auger at its lower end to aid in lifting the fluid to the rotating separating member. The rotating separator member causes denser fluid to move toward the outer wall of separator 11 due to centrifugal force. The fluid mixture then travels to the upper end of separator 11 and passes through a flow divider 25 or cross-over member, shown in FIG. 2. A radial support bearing is often required to support the span of such a long central shaft, causing pressure head loss in the fluid from flow around this bearing. This loss can limit the flow potential of the separator.

Divider 25 comprises a circular ring and a conical upper end. Divider 25 is oriented to be parallel to and coaxial with central shaft 21. One or more gas exit ports 27 communicate an opening in the sidewall of separator 11 and the interior of flow divider 25. As the fluid nears flow divider 25, the outer (more dense) fluid remains in the annulus surrounding flow divider 25 and is diverted radially inward and upward to a liquid exit port 29. The inner (less dense) fluid enters flow divider 25 and is channeled radially outward and upward to gas exit ports 27. Liquid exit port 29 leads to pump 15, but gas exit ports 27 open into annulus 19 (FIG. 1).

A problem with using flow divider 25 in separator 11 is that the flow rate of the fluid through gas exit ports 27 may limit the effectiveness of separator 11. Liquid loading, or back pressure, may interfere with the exit of gas. A variety of passage shapes have been used for gas exit and liquid exit ports in gas separators. These range from curved diffusion flow paths to straight holes drilled through the side of the separator. The number of holes varies and is dependent on the diameter of the equipment. A separator having a four-inch diameter may have only four holes, whereas a larger unit may have six, eight, or more holes. Each hole has a wetted perimeter that is much smaller than the wetted perimeter of the separator body at the flow divider. The original design criterion was to achieve low resistance and uniform flow around the gas exits. This is not necessary, as there is no advantage to having uniform flow around the gas exit ports. U.S. Pat. No. 6,113,675 discloses an impeller within the flow divider to enhance flow of gas to the exterior. This arrangement is illustrated in FIG. 3, which shows impeller 31 having blades 33 and located within flow divider 25.

BRIEF SUMMARY OF THE INVENTION

In this invention, in one embodiment, a single large gas exit port is used and may be combined with a single large fluid inlet in the separator. The port preferably has a wetted perimeter that is at least 30% of the wetted perimeter of the gas separator housing in the flow divider annulus.

To provide for a shorter central shaft that does not require a mid-length radial support bearing, another embodiment provides for the separation and lifting functions to be combined in one section of the separator. An inducer or auger is located within a rotary cylinder that leads to a flow divider. The more-dense fluid is accelerated outward and displaces the less-dense fluid, which remains near the central portion of the cylinder. The less-dense fluid moves into the flow divider, which is located along the central axis of the cylinder, and to a gas exit port, whereas the more-dense fluid passes around the flow divider to a liquid exit port.

To provide for continuous separation of more- and less-dense fluid components, the invention also provides embodiments that have a rotating chamber with at least one hole in the sidewall of the chamber. Each chamber may have an internal auger or may have vertical baffles. In the case of an auger, the holes may be helical slots extending partially around the chamber at the same helix angle as the auger. Alternately, the holes may individual circular holes located above and adjacent the flight of the auger. In the case of vertical baffles, the holes may be in vertical columns adjacent the baffles. The chambers may have tapered profiles. Alternatively, a plurality of sub-chambers may be used, each having a smaller radius than the preceding, upstream sub-chamber. An impeller may optionally be located in the flow divider in all of the embodiments.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 4:
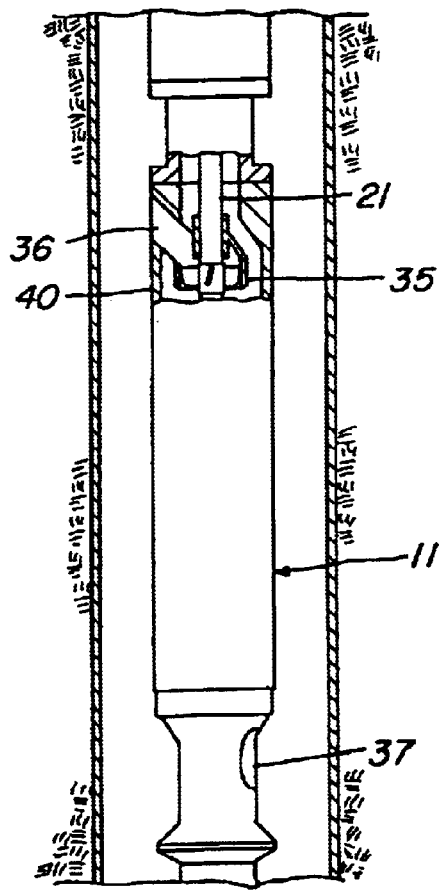
FIG. 4 is a cross-sectional view of a first embodiment of a gas separator constructed in accordance with the present invention.

Referring to FIG. 4, a lower exit pressure can be achieved through the use of a central flow divider 35 leading to a single, very large gas exit port 36 and by centralizing the ESP within the well to prevent blocking of the exit flow by the well casing. Exit port 36 preferably is circular and has a wetted perimeter equal or greater than 30% of the wetted perimeter of the housing or body 40 of separator 11 measured in the flow divider annulus at the lower end of flow divider 35. The wetted perimeter refers to the outer perimeter of a passage that is in contact with the fluid flowing through it. In one embodiment, the wetted perimeter of exit port 36 is 45% of the wetted perimeter of body 40 measured in the divider annulus at the lower end of divider 35. Although shown circular, exit port 36 could be other than circular.

The single large diameter exit port 36 may be more effective when combined with a large single-hole fluid entrance 37. For still higher effectiveness, entrance 37 to separator 11 and exit 36 are preferably oriented so that fluid entrance 37 is located on the opposite side of separator 11 as gas exit 36 and near the lower end. Separator 11 may be even more efficient if offset within the well, opening gas port 36 to the largest free-flow area, though tests have shown that the effect of offsetting, and possibly of the opposing orientation of the ports, is reduced in a narrow annulus between the casing and the ESP. Conversely, an increased effect is seen in large-casing installations.

Figure 1:
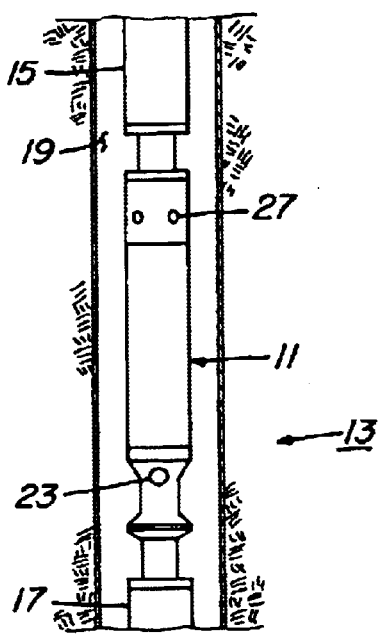
FIG. 1 is a cross-sectional view of a well with a prior-art downhole pump assembly installed therein.
Figure 2:
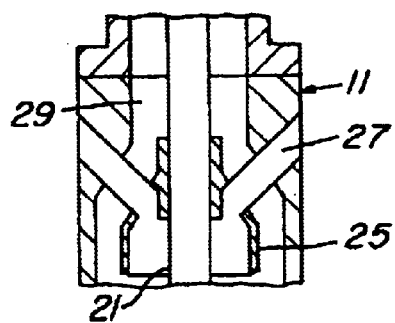
FIG. 2 is a cross-sectional view of a prior-art flow divider in the gas separator of FIG. 1.
Figure 3:
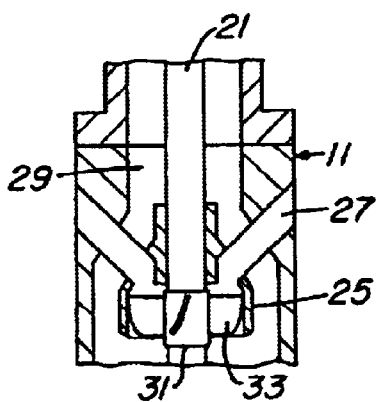
FIG. 3 is a cross-sectional view of a prior-art flow divider, showing an impeller located in the flow divider.
Figure 5:
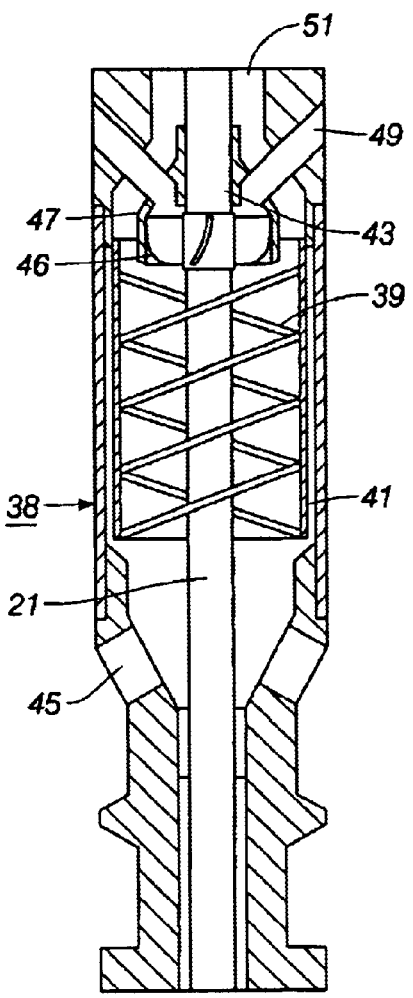
FIG. 5 is a cross-sectional view of a second embodiment of a gas separator constructed in accordance with the present invention.

To overcome the problem of pressure head loss with flow around a radial support bearing, separator 38, shown in FIG. 5, uses an inducer or auger 39 located within a rotary cylinder 41. The outer edges of the flights of auger 39 are connected to the inner diameter of cylinder 41, and auger 39 and cylinder 41 rotate in unison. The inner edges of auger 39 are at shaft 21. Although not shown, preferably the inner edges of auger 39 are joined to a hub that slides over shaft 21. This combination is attached to and rotates with a central shaft 43 to provide both lifting and separation functions. The fluid enters separator 38 through openings 45 at the lower end and is drawn into chamber 41 by auger 39. The pressure of the fluid as it flows up the helical channel defined by auger 39 increases. Also, separation of dense and less dense fluid takes place within the helical channel. Above auger 39 is a standard flow divider 47, and the fluid is separated as described for FIGS. 2 and 3 before passing to gas exit ports 49 and liquid exit port 51. This allows shaft 43 to be shorter and obviates the need for an additional radial support bearing. Impeller 46 in flow divider 47 is optional.

The typical separator produces a fluid flow that travels upward into a separation area, into a flow divider, and then into appropriate exit ports. However, more efficient separation may be obtained if the liquid is continuously removed from the mixture as the separation process occurs. The liquid is allowed to move out of the separation device as the mixture moves upward, and the fluid remaining in the device is directed to the gas exit port. FIGS. 6 through 10 depict several embodiments of continuous liquid-removal devices.

Figure 6:
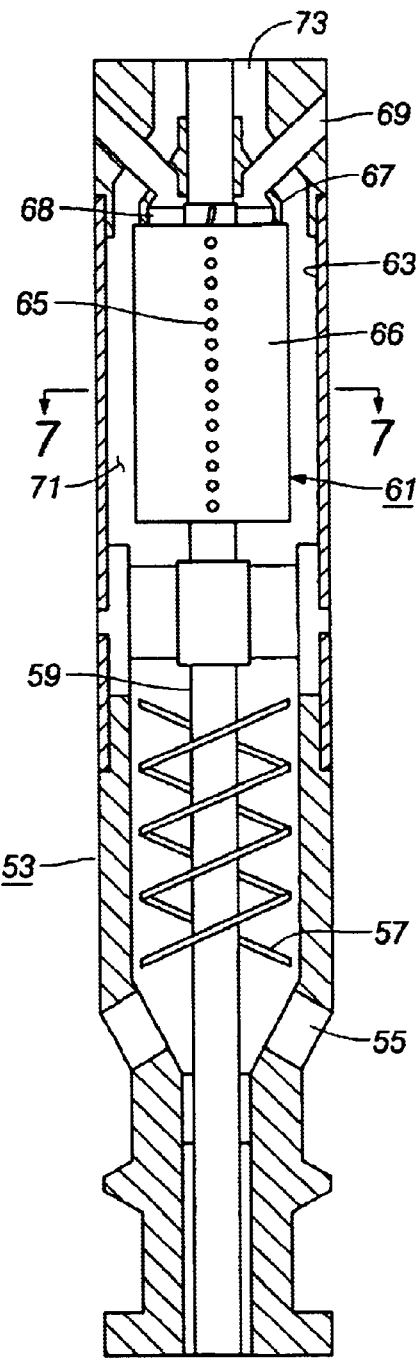
FIG. 6 is a cross-sectional view of a third embodiment of a gas separator constructed in accordance with the present invention.

Referring to FIG. 6, fluid enters a separator 53 through openings 55 at the base and is lifted and partially separated by an auger 57 that rotates with central shaft 59. In this embodiment, there is no rotating cylinder surrounding auger 57, as in FIG. 5. The fluid travels upward, and the less dense inner fluid enters a rotary chamber 61. Chamber 61 is open at both the upper and lower ends and has an outer diameter less than the inner diameter of an inner surface 63. The more dense outer fluid continues along inner surface 63 of the outer wall of separator 53 and does not enter chamber 61. Chamber 61 is a vertical cylinder having a plurality of holes 65 in its outer wall 66, holes 65 being in vertically-aligned columns. A standard flow divider 67 sealingly engages the upper end of chamber 61 and communicates the interior of chamber 61 and gas exit ports 69. An annulus 71 is defined by wall 66 of chamber 61 and inner surface 63 of separator 53. The liquid stream flows through annulus 71 and into liquid exit port 73. Impeller 68 within flow divider 67 is optional.

Figure 7:
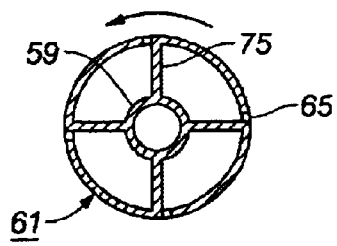
FIG. 7 is a cross-sectional view of the rotary chamber of the separator in FIG. 6.

As shown in the section view in FIG. 7, four columns of holes 65 are arrayed around chamber 61. Four vertical baffles 75, which also may be referred to herein as blades or vanes, connect outer wall 66 of chamber 61 to central shaft 59 and are spaced within chamber 61 and separate chamber 61 into four equal sections. Each baffle 75 extends for approximately the height of chamber 61 and is parallel to and adjacent one of the columns of holes 65. Chamber 61 is uni-directional, and each baffle 75 is located so that it follows immediately behind the column of holes 65 during rotation. When chamber 61 is rotating, the mixture in each section is forced toward a trailing baffle 75 due to tangential acceleration, and the more dense liquid is forced outward toward holes 65 due to centrifugal acceleration. Referring again to FIG. 6, the liquid flows out of holes 65, into annulus 71, and upward to liquid exit port 73. As the mixture moves upward in chamber 61, the liquid content is continually reduced. The mixture that remains inside chamber 61 passes through flow divider 67 and directly into gas exit ports 69 and out into the well. Although the vertical columns of holes 65 are shown extending from near the bottom of chamber 61 to near the top, they could begin at a higher point along chamber 61.

Figure 8:
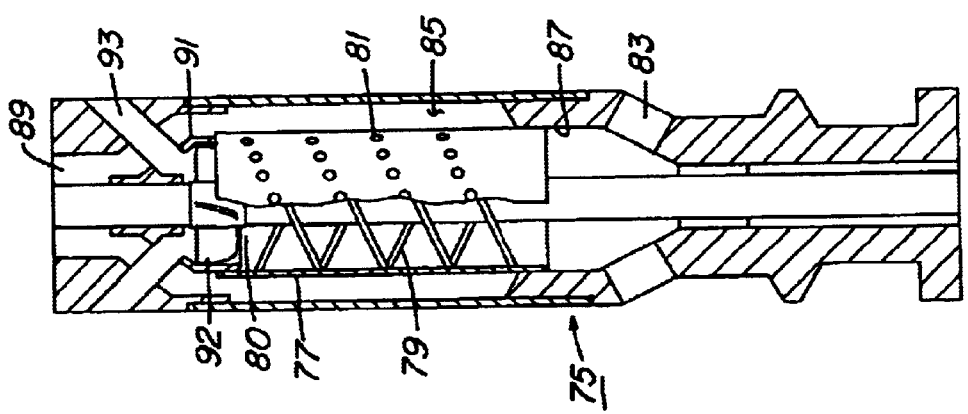
FIG. 8 is a cross-sectional view of a fourth embodiment of a gas separator constructed in accordance with the present invention.

FIG. 8 shows an embodiment of a separator 75 having a continuous liquid-removal rotating chamber 77 in which an auger 79 with helical flights is integrally formed, the combination rotating with a central shaft 80. Rather than being in vertical columns, holes 81 are arrayed around the sidewall of chamber 77 in a helical pattern parallel to and immediately above each helical vane of auger 79. As chamber 77 rotates, auger 79 draws the fluid from intake openings 83 into chamber 77 and moves the fluid upward while causing the dense fluid to move toward the outside of chamber 77. The liquid passes out of holes 81 and into an annulus 85 surrounding chamber 77. To keep the liquid in annulus 85 from traveling back down to openings 83, the outer surface of the lower portion of chamber 77 seals against an inner surface 87 of the sidewall of separator 75. The pressure of liquid being forced out of chamber 77 drives the liquid in annulus 85 upward to the liquid exit port 89 at the upper end of separator 75. As in the embodiment in FIG. 8, a flow divider 91 sealingly engages the top of chamber 77 for directing the mixture remaining in chamber 77 into gas exit ports 93. Impeller 92 within flow divider 91 is optional. Holes 85 need not begin at the bottom of chamber 77, rather could begin at higher points along chamber 77.

Figure 10:
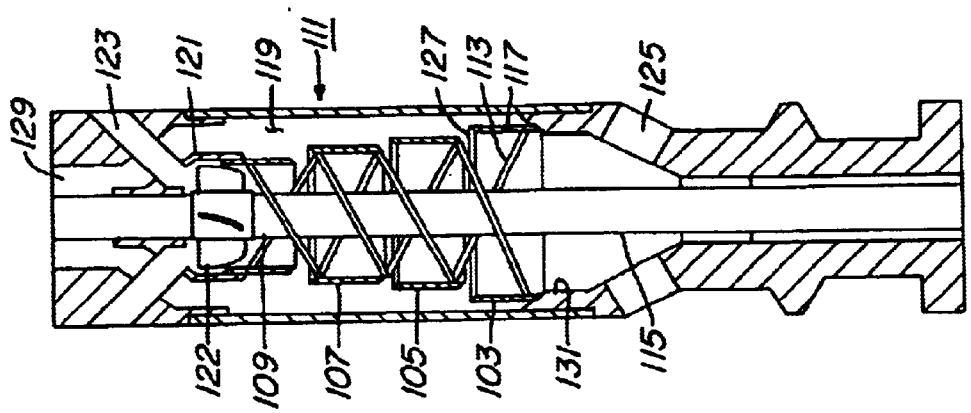
FIG. 10 is a cross-sectional view of an sixth embodiment of a gas separator constructed in accordance with the present invention.
Figure 9:
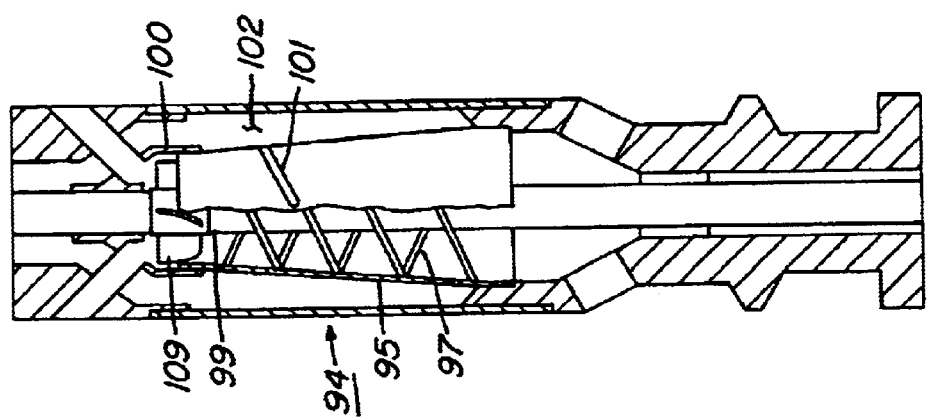
FIG. 9 is a cross-sectional view of a fifth embodiment of a gas separator constructed in accordance with the present invention.

FIGS. 9 and 10 illustrate additional embodiments of the auger-chamber combination. While the volume of liquid decreases in a rotary chamber as the mixture moves upward in the chamber, the volume of liquid in the annulus outside of the chamber increases. If the diameter of the rotary chamber is constant, then the velocity of the liquid on the outside of the chamber must continuously increase, and the velocity of the mixture on the inside of the chamber must continuously decrease. A tapered (FIG. 9) or stepped (FIG. 10) chamber can provide a more uniform velocity distribution inside and outside of the chamber.

As shown in FIG. 9, a separator 94 comprises a tapered chamber 95, the upper end of chamber 95 having a smaller diameter than the lower end. Chamber 95 houses helical vanes 97 for moving and separating the mixture within chamber 95 when chamber 95 and vanes 97 rotate with central shaft 99. At least one hole 101 and preferably two are located in the sidewall of chamber 95 and immediately above vane 97. Hole 101 is a helical slot extending partially around the circumference of chamber 95, such as about 90 degrees. Hole 101 is located near the upper end of chamber 95 and extend at the same helical angle as vanes 97. Chamber 77 of FIG. 8 could also use one or more helical holes 101 rather than separate circular holes 81.

The fluid mixture is separated as in the embodiment in FIG. 8, with liquid flowing out of hole 101 and into annulus 102. Fluid is held in annulus 102 by a sealing engagement of the lower end of chamber 95 with the inner surface of the sidewall of separator 94. The upper end of chamber 95 sealingly engages a flow divider 100. Though shown with a taper in which the diameter of chamber 95 decreases linearly, the taper may also be nonlinear or may be stepped, as discussed below. Impeller 104 within flow divider 100 is optional.

Chambers 103, 105, 107, 109 of separator 111, also referred to as sub-chambers and shown in FIG. 10, each contain a set of two half-turn helical vanes 113 having equal diameters. Chambers 103, 105, 107, 109 and vanes 113 rotate with a central shaft 115. The diameter of vanes 113 in chambers 103, 105, 107 are larger than vanes 113 in each chamber immediately above, the lowermost chamber 103 having the largest vanes 113. Each chamber 103, 105, 107, 109 has a generally vertical sidewall 117, with the lower edge of each sidewall 117 is tapered or curved toward central shaft 115. The upper edges of chambers 103, 105, 107 are open to an annulus 119 surrounding the stack of chambers 103, 105, 107, 109. The upper edge of uppermost chamber 109 sealingly engages a flow divider 121 for directing the flow of the remaining mixture into gas exit ports 123. The fluid in annulus 119 is prevented from traveling down to intake openings 125 by sealing the lower end of the outer surface of chamber 103 to an inner surface 131 of separator 111.

Fluid is drawn into intake openings 125 in the lower portion of separator 111. As the fluid mixture is moved upward in lowermost chamber 103, the dense fluid moves toward sidewall 117 of chamber 103. When the dense fluid (liquid) reaches the upper edge of chamber 103, it exits chamber 103 into annulus 119 through gap 127 between the upper edge of chamber 103 and the lower edge of chamber 105, the rounded lower edge providing a larger flow area for the exiting liquid. The inner fluid continues upward into chamber 105, and the process repeats as for lowermost chamber 103, the liquid content of the mixture decreasing as the fluid moves out of each chamber 103, 105, 107 and into the next chamber 105, 107, 109. When the fluid reaches the upper end of uppermost chamber 109, the remaining fluid flows through flow divider 121 to gas exit ports 123. The liquid in annulus 119 travels upward and out of a liquid exit port 129. Impeller 122 within flow divider 121 is optional. Rather than helical vanes 113, vertical baffles or vanes could be located in the various chambers 103, 105, 107, and 109.

Several embodiments of gas separators have been disclosed, and each is designed to provide more efficient means of separating a mixture into more-dense and less-dense fluid components. An impeller can be added within a gas separator and near a typical flow divider to eliminate liquid loading in gas exit ports. A lower exit pressure can be achieved by having one very large opening for the gas exit. Combining the auger and separating chamber can limit the length of the central shaft and the separator housing and eliminate the need for a radial support bearing to support the shaft. Continuous liquid removal from the mixture is more efficient than the typical flow divider, and reducing the separating chamber diameter as the mixture moves toward the exits increases the efficiency still further.

While the invention has been shown in only some of its forms, it is not thus limited but is susceptible to various changes and modifications without departing from the spirit thereof.

We claim:

1. A gas separator comprising:
   a tubular body having a central axis;
   a shaft extending longitudinally along the central axis within the body;
   a rotary separator member rotatably carried within the body and affixed to the shaft for rotation therewith, the separator member being adapted to impart radial acceleration on fluid moving through the body for causing the fluid to separate into less-dense and more-dense components, the more-dense component being propelled radially outward toward a sidewall of the body, the less-dense component remaining near the central axis;
   a flow divider located within the body and along the central axis, the flow divider being adapted to cause the fluid components to follow separate flow paths, the less-dense component flowing into an interior of the flow divider, the more-dense component flowing past the flow divider through a divider annulus defined by an outer surface of the flow divider and an inner surface of the sidewall of the body;
   a first outlet for the more-dense component, the first outlet being in communication with the divider annulus;
   a second outlet, the second outlet being a single aperture having a wetted perimeter at least about 30% of a wetted perimeter of the divider annulus and being adapted to communicate the less-dense component from the interior of the flow divider to an opening in the sidewall of the body; and
   a fluid inlet longitudinally-spaced from the outlets.

2. The gas separator of claim 1, further comprising:
   an impeller located upstream of the second outlet and downstream of the rotary separator member, the impeller being within the flow divider and rotating with the central shaft, the impeller being oriented to urge fluid toward the second outlet.

3. A gas separator comprising:

a tubular body having a central axis;

a shaft extending longitudinally along the central axis within the body;

a chamber rotatingly carried within the body and affixed to the shaft for rotation therewith, the chamber having a tubular outer wall and a helical vane located within the chamber for rotation therewith, the chamber being adapted to impart radial acceleration on fluid moving through the body for causing the fluid to separate into less-dense and more-dense components, the more-dense component being propelled radially outward toward a sidewall of the body, the less-dense component remaining near the central axis;

a flow divider located within the body downstream of the chamber, the flow divider being adapted to cause the fluid components to follow separate flow paths, the less-dense component flowing into an interior of the flow divider, the more-dense component flowing past the flow divider through a divider annulus defined by an outer surface of the flow divider and an inner surface of the sidewall of the body;

a first outlet for the more-dense component, the first outlet being in fluid communication with the divider annulus;

a second outlet adapted to communicate the less-dense component from the interior of the flow divider to an opening in the sidewall of the body; and a fluid inlet longitudinally-spaced from the outlets.

4. The gas separator of claim 3, further comprising:

an impeller located within the flow divider, the impeller rotating with the central shaft and oriented to urge fluid toward the second outlet.

5. The gas separator of claim 3, wherein:

the second outlet is a single outlet with a wetted perimeter at least about 30% of a wetted perimeter of the divider annulus in the body.

6. The gas separator of claim 3, wherein:

the helical vane has an inner edge at the shaft, an outer edge at the wall of the chamber and extends for substantially the length of the chamber.

7. The gas separator of claim 3, wherein:

the chamber defines a chamber annulus in the body; and the separator further comprises at least one hole extending through the wall of the chamber for outward flow of the more-dense component into the chamber annulus.

8. The gas separator of claim 7, wherein the hole is a helically extending slot.

9. The gas separator of claim 3, wherein:

the wall of the chamber tapers from an upstream larger diameter to a downstream smaller diameter.

10. The gas separator of claim 3, wherein:

the wall of the chamber is divided into a plurality of segments, each of the segments being a separate cylindrical member, the segments having successively smaller diameters from an upstream end of the chamber to a downstream end of the chamber, defining an annular clearance for the upward flow of the more-dense component.

11. A gas separator comprising:

a tubular body having a central axis;

a shaft extending longitudinally along the central axis within the body;

a chamber located within the body for rotation with the shaft, the chamber having a tubular outer wall, the chamber having at least one hole through the outer wall, the chamber being adapted to impart radial acceleration on fluid moving through the body for causing the fluid to separate into less-dense and more-dense components, the more-dense component being propelled radially outward toward the outer wall and at least some of the more-dense component passing out of the chamber through the hole and into a chamber annulus defined by an outer surface of the outer wall and an inner surface of the sidewall of the body, the less-dense component remaining near the central axis;

a flow divider located within the body downstream of the chamber for diverting the less-dense component flowing upward in the chamber into an interior of the flow divider;

a first outlet for the more-dense component, the first outlet being in fluid communication with the chamber annulus;

a second outlet being adapted to communicate the less-dense component from the interior of the flow divider to an opening in the sidewall of the body; and a fluid inlet longitudinally-spaced from the outlets.

12. The gas separator of claim 11, wherein:

said at least one hole in the outer wall of the chamber comprises a plurality of holes aligned in a plurality of vertical columns.

13. The gas separator of claim 11, further comprising:

a baffle extending axially through the chamber, defining a plurality of sub-chambers; and wherein said at least one hole comprises a plurality holes located in a plurality of axial columns, each of the columns communicating with one of the sub-chambers.

14. The gas separator of claim 11, further comprising:

a helical vane located within and rotating with the chamber, the vane having an inner edge at the shaft and an outer edge at the wall of the chamber, the vane extending for substantially the length of the chamber.

15. The gas separator of claim 11, wherein:

a diameter of the outer wall of the chamber decreases linearly from a larger diameter at an upstream end of the chamber to a smaller diameter at a downstream end of the chamber.

16. The gas separator of claim 11, further comprising:

an impeller located upstream of the second outlet, the impeller rotating with the shaft and oriented to urge fluid toward the second outlet.

17. The gas separator of claim 11, wherein:

the second outlet is a single aperture with a wetted perimeter at least 30% of a wetted perimeter of a divider annulus surrounding a lower portion of the divider.

18. A gas separator comprising:

a tubular body having a central axis;

a shaft extending longitudinally along the central axis within the body;

a plurality of sub-chambers located within the body and having a vane located within each sub-chamber, each sub-chamber having a tubular outer wall attached to the periphery of the vane, the outer walls of the sub-chambers having successively smaller diameters in an upward direction, each sub-chamber having an open upper end and an open lower end and being adapted to impart radial acceleration on fluid moving through the sub-chambers for causing the fluid to separate into less-dense and more-dense components, the more-dense component being propelled radially outward toward the outer wall and passing out of the sub-chamber at a periphery of each upper end and into a chamber annulus defined by an outer surface of each of the outer walls and an inner surface of the sidewall of the body, the less-dense component moving from a lower sub-chamber into a higher sub-chamber;

a flow divider located within the body above the sub-chambers for diverting the less-dense fluid component flowing upward in the sub-chambers into an interior of the flow divider;

a first outlet for the more-dense component, the first outlet being in fluid communication with the annulus;

a second outlet adapted to communicate the less-dense component from the interior of the flow divider to an opening in the sidewall of the body; and a fluid inlet longitudinally-spaced from the outlets.

19. The gas separator of claim 18, wherein:

a lower portion of the outer surface of the outer wall of the lowermost sub-chamber sealingly engages the inner surface of the sidewall of the body for sealing a lower portion of the annulus.

20. The gas separator of claim 18, further comprising:

an impeller located within the flow divider, the impeller rotating with the shaft and oriented to urge fluid toward the second outlet.

21. The gas separator of claim 18, wherein:

the second outlet has is a single aperture with a wetted perimeter at least about 30% of a wetted perimeter of a divider annulus surrounding a lower portion of the flow divider.

22. The gas separator of claim 18, wherein:

the vane within each of the sub-chambers is helical and extends from the outer wall of each of the sub-chambers to the shaft, the vanes and the sub-chambers rotating with the shaft.

23. The gas separator of claim 18, wherein the sub-chamber rotate with the shaft.

* * * * *

UNITED STATES PATENT AND TRADEMARK OFFICE
CERTIFICATE OF CORRECTION

PATENT NO.     : 6,723,158 B2
DATED          : April 20, 2004
INVENTOR(S)    : Donn J. Brown et al.

It is certified that error appears in the above-identified patent and that said Letters Patent is hereby corrected as shown below:

Column 2,
Line 38, insert -- be -- after "may"

Column 5,
Line 27, delete "extend" and insert -- extends --
Line 50, delete "is" before "tapered"

Signed and Sealed this

Twenty-third Day of November, 2004

JON W. DUDAS
*Director of the United States Patent and Trademark Office*